UNITED STATES PATENT OFFICE.

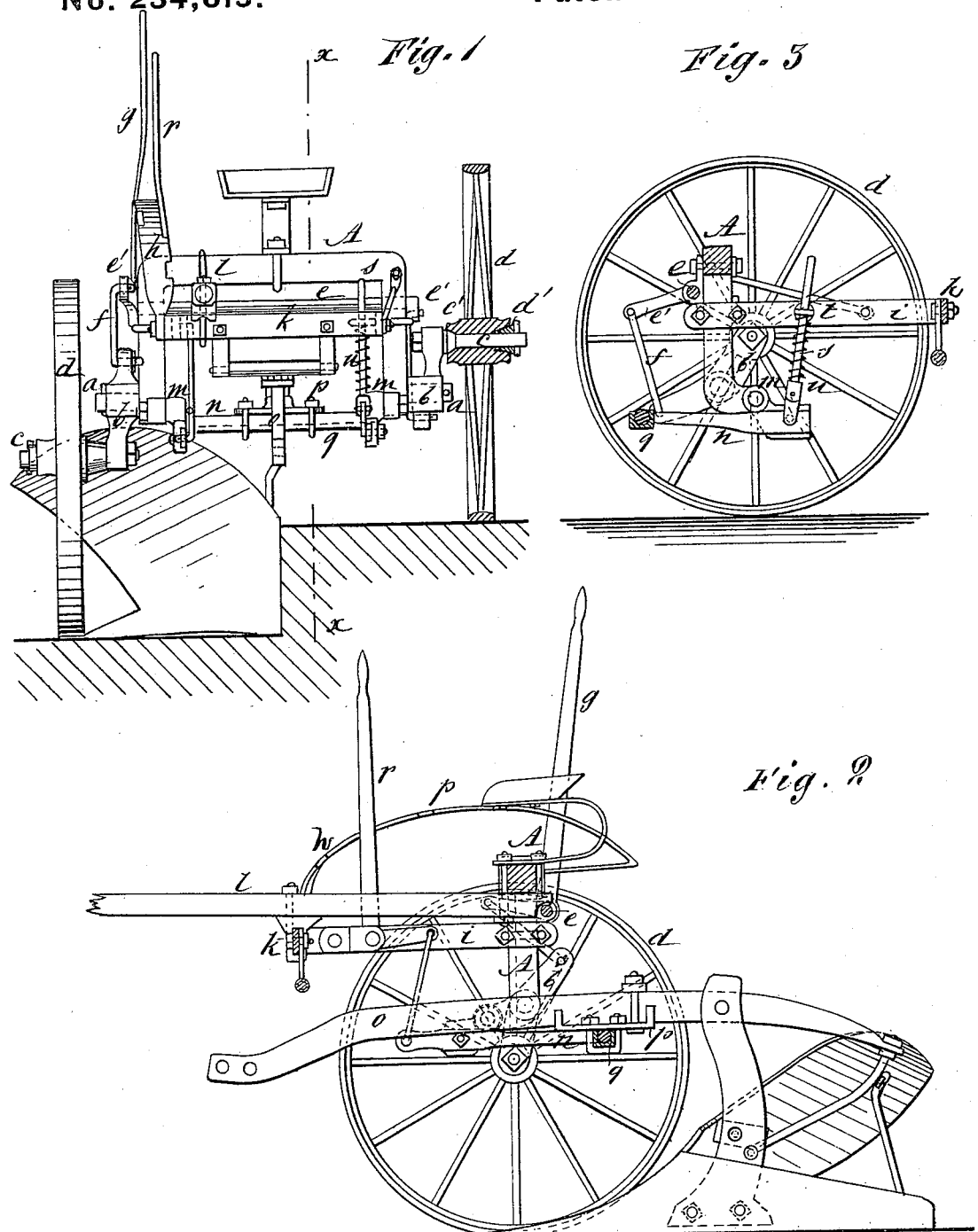

WILLIAM H. RYER, OF LA CROSSE, WISCONSIN, ASSIGNOR TO HIMSELF AND ALBERT HIRSHHEIMER, OF SAME PLACE.

SULKY-PLOW.

SPECIFICATION forming part of Letters Patent No. 234,615, dated November 16, 1880.

Application filed July 19, 1880. (Model.)

*To all whom it may concern:*

Be it known that I, WILLIAM H. RYER, of La Crosse, in the county of La Crosse and State of Wisconsin, have invented a new and useful Improvement in Sulky-Plows, of which the following is a specification.

The object of my invention is to provide for leveling the sulky-frame and regulating the depth and width of furrow in the operation of sulky-plows, either single or gang.

My invention consists in the mechanism for raising and lowering the plow upon the frame, and in certain other features of construction, all of which will be described hereinafter with reference to the accompanying drawings, wherein—

Figure 1 is a front elevation of the machine, partially in section. Fig. 2 is a vertical longitudinal section on line $x$ $x$ of Fig. 1. Fig. 3 is a similar view, representing the opposite side of the machine.

Similar letters of reference indicate corresponding parts.

The frame of the sulky consists of the bent or arched cross-bar A, upon the ends of which are fixed trunnions or other bearings $a$, that carry arms or levers $b$.

The arms $b$ are bent in opposite directions, and are fitted at their forward end with short spindles $c$, upon which are the supporting-wheels $d$ $d$ of the machine.

Across the arch A, in suitable bearings, is fitted a rock-shaft, $e$, having its ends bent, or provided with crank-arms $e'$, extending in opposite directions, and connected by rods $f$ $f$ with the rear ends of arms $b$.

Upon the shaft $e$ is fixed a lever, $g$, that extends upward for operation by the driver, and is held in place as moved by a notched bar, $h$. By means of lever $g$ the shaft $e$ can be given a partial revolution in either direction, and arms $b$ thereby moved on bearings $a$.

The crank-arms of shaft $e$ being extended in opposite directions, the movement of lever $g$ carries one arm $b$ upward and the other downward, consequently raising the sulky-frame on one wheel and lowering it on the other. By this construction a quarter-turn of the shaft gives the same extent of movement as would be obtained by a half-turn applied to raise one side of the frame some distance, and the driver is not required to lift his own weight. The wheels also retain their vertical position parallel with each other.

To the arched bar A is connected a frame consisting of side bars, $i$, and forward cross-bar, $k$. $l$ is the tongue, secured by a clip or shackle to bar A, and also secured by a shackle to the cross-bar $k$. By loosening the nuts of the clips the tongue can be adjusted sidewise of the frame and set for two, three, or four horses, as required.

Upon the lower ends of the arched bar A there are fitted trunnions $m$ $m$, which extend inward, and upon which are hung the ends of the bail $n$, that extends backward and supports the plow.

To the beam $o$ of the plow is attached a ring or plate, $p$, that is attached by clips upon the bail $n$. There is upon the bail $n$ a half-tube bearing, $q$, around which the clips pass, so that while the beam is securely held it can spring on bail $n$, and side movement is prevented by the ends of tube $q$ taking against the bent ends of bail $n$.

One end of bail $n$, which extends in front of its trunnion $m$, is connected by a rod with one end of a bent lever, $r$, that is hung on frame-bar $i$, and extends up at one side of the notched bar $h$ for operation by the driver. To the other end of bail $n$ is hung a rod, $s$, that extends through a lug or bracket, $t$, on the other bar $i$, and carries a spiral spring, $u$, around it between lug $t$ and bail $n$.

By movement of lever $r$ the bail $n$ is swung on its trunnions $m$, and the plow thus raised and lowered. As the plow is lowered the spring on rod $s$ is compressed, so that in raising the plow again the spring assists by its expansion.

The width of furrow is regulated by adjustment of the plow-beam on bail $n$. The forward end of the beam is prevented from rising by a bracket depending from the bar $k$.

To compensate for wear of the spindles $c$ and boxes of wheels $d$ the spindles are provided at their inner ends with conical collars $c'$, as shown in Fig. 1, and the wheels are retained upon the spindles by conical collars $d'$, that are held in place by pins or nuts. The hubs are formed with tapering recesses to receive the collars $d$, so that the hubs are held between collars $d'$ $c'$.

By the above-described construction the machine can be readily handled by the driver and the frame and plow leveled on uneven ground with great facility and without throwing the wheels out of line.

Having thus described my invention, I claim as new and desire to secure by Letters Patent—

The combination, with the arched cross-bar A, having the trunnions $m$, of the U-shaped cross-bar $n$, connecting with lever $r$ and extending backward to support the plow, the plate $p$, and half-tube $q$, the rod S, having spiral spring $u$, and the frame having lug $t$, substantially as and for the purpose specified.

WILLIAM HENRY RYER.

Witnesses:
MARY C. FOX,
H. FOX.